United States Patent
Ho-Lung et al.

(10) Patent No.: US 6,871,242 B1
(45) Date of Patent: Mar. 22, 2005

(54) PERSONAL COMPUTER WITH A BIOMETRIC SENSOR HAVING IMPROVED RESISTANCE TO ENVIRONMENTAL DISTORTIONS

(75) Inventors: Joseph Anthony Ho-Lung, Wake Forest, NC (US); James Gordon McLean, Fuquay-Varina, NC (US); Tin-Lup Wong, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 09/282,862

(22) Filed: Mar. 31, 1999

(51) Int. Cl.[7] .................. G06F 13/00; G06F 3/06; G06F 3/18
(52) U.S. Cl. .................. 710/16; 710/36; 710/73; 345/157; 382/125; 713/180
(58) Field of Search .................. 713/180; 382/125; 235/380; 345/157; 257/77; 710/73, 36, 16

(56) References Cited

U.S. PATENT DOCUMENTS

| | | | | |
|---|---|---|---|---|
| 5,737,439 A | * | 4/1998 | Lapsley et al. | 382/115 |
| 5,987,155 A | * | 11/1999 | Dunn et al. | 382/116 |
| 6,064,753 A | * | 5/2000 | Bolle et al. | 382/125 |
| 6,084,977 A | * | 7/2000 | Borza | 382/124 |
| 6,091,082 A | * | 7/2000 | Thomas et al. | 257/77 |
| 6,193,153 B1 | * | 2/2001 | Lambert | 235/380 |
| 6,292,173 B1 | * | 9/2001 | Rambaldi et al. | 345/157 |

* cited by examiner

*Primary Examiner*—Rehana Perveen
(74) *Attorney, Agent, or Firm*—Winstead Sechrest & Minick P.C.

(57) ABSTRACT

The present invention is a personal computer system and method including a biometric sensor which is protected from environmental forces and which resists certain attacks by sensing whether a living person is providing the biometric identification. A second sensor provides an input as to whether the biometric input is from a living person, through the sensing of a life-indicative parameter such as an appropriate level of blood oxygen in the sensed item, and the sensors are covered by a removal cover which provides electrostatic discharge when the cover is opened.

4 Claims, 3 Drawing Sheets

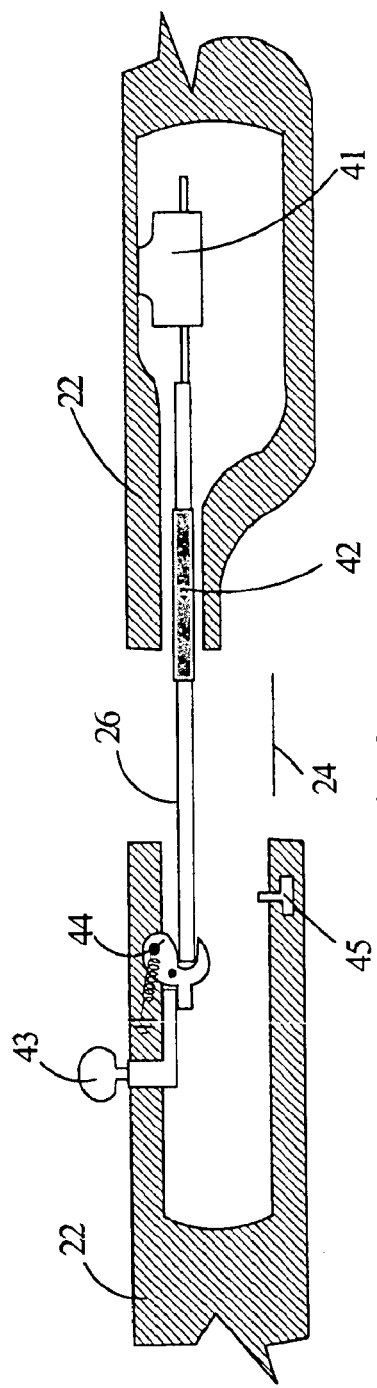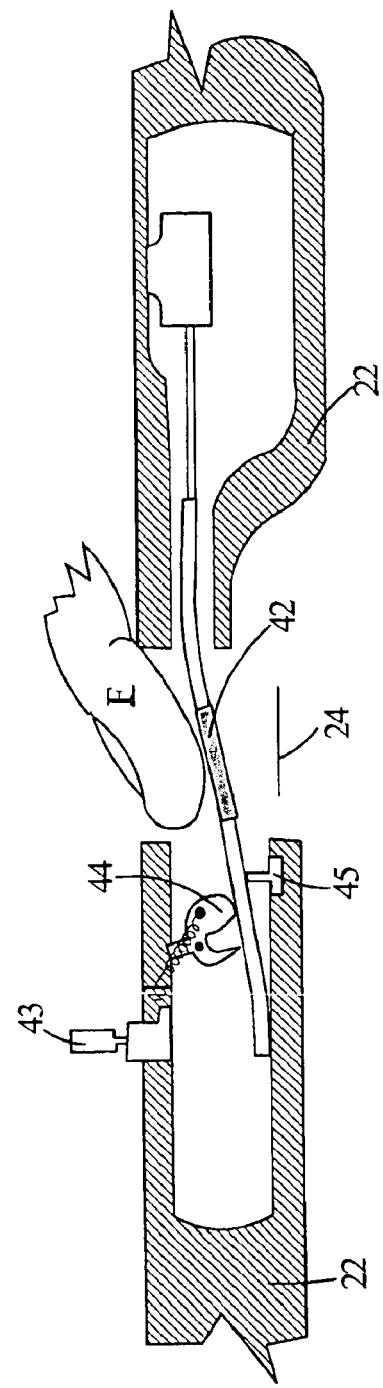

PERSONAL COMPUTER WITH A BIOMETRIC SENSOR HAVING IMPROVED RESISTANCE TO ENVIRONMENTAL DISTORTIONS

FIELD OF INVENTION

The present invention relates to an improved personal computer with a biometric sensing device incorporated therein. More particularly, the present invention relates to a personal computer with a biometric sensor having improved resistance to environmental distortions and a method of making the personal computer resistant to the environment.

BACKGROUND ART

Personal computer in general, and the IBM personal computers in particular, provide access to computing power for individuals, either as stand-alone machines or as terminals for connecting to a network of other computers.

As personal computers become more available and more powerful, providing effective security for such personal computers and the data accessible therethrough has become more of an issue. Ideally, it would be desirable if the full computing power of the personal computer and its associated network should be available quickly and easily with no overhead to an authorized user and should be denied totally to an unauthorized user.

Biometrics is the use of personal characteristics to identify an individual and includes such characteristics as fingerprint sensing and analysis as well as other features such as retina scan, signature verification and hand geometry analysis. Using biometrics to determine who is authorized to use a resource such as a personal computer or to access a restricted area is well known in the art, and it has even been proposed to include a fingerprint sensor on a personal computer to assist in the authorization process. Characteristics of a fingerprint for each authorized user of the personal computer are stored in the personal computer, then the individual Identifies himself as authorized to use the computer by providing a fingerprint.

Of course, clever people have thought of ways to try to defeat the biometric identification systems, such as by providing an artificial finger or a portion on which a fingerprint has been provided. If the system does not know whether the device being scanned is a part of a real body, then the artificial finger could fool the sensor.

Fingerprint scanners also are subject to environmental forces such as humidity, dirt and electrostatic currents. Such sensors must be open for providing the individuals input which typically occurs during a very small part of the operation of the personal computer, perhaps only at an initial power on when the personal computer is turned on. It would be desirable if the biometric sensor were easily accessible during this time, but then shut up and protected from such forces until it is needed again.

Accordingly, the use of biometric identification in a personal computer raises many issues which are essential for the effective operation of the personal computer, but which could adversely limit the effectiveness of biometrics. Thus, the use of biometrics for identification in a personal computer has not been adopted, due, in part, to these limitations and disadvantages.

SUMMARY OF THE INVENTION

The present invention is a system and method for biometric identification of a user at a personal computer in which the identification system is protected from adverse environmental effects such as static electric discharge, especially when the sensor is not in use, and where the biometric system is protected from attack, as by an artificial finger.

The present invention has the effect that a biometric sensor, such as a fingerprint sensor, is protected from adverse forces including the static electric charge potential inherent in a person, especially during those times when the sensor is not being employed. In its preferred embodiment, the sensor is provided with a cover and the process of opening the cover allows any differences in electrical charge potential between the user and the computer to be equalized prior to contact with the sensor by providing a current path through which static charges my be shunted to the computer system reference ground without adversely effecting the sensor.

Other objects and advantages of the present invention will be apparent to those skilled in the art in view of the description of the preferred embodiments which follow, taken in conjunction with the appended claims and the accompanying drawings.

BRIEF DESCRIPTION OF THE DRAWINGS

Some of the objects and advantages of the present invention having been stated, other objects will appear as the description proceeds, when taken with the accompanying drawings in which:

FIG. 3 is an alternate embodiment of the cut away view of a section of the personal computer of FIG. 1 taken along the line II—II in FIG. 1, showing a modified movable cover system with the cover in its closed position.

FIG. 3A is another view of the alternate embodiment of FIG. 3 with the cover moved into its open position.

DETAILED DESCRIPTION OF THE DRAWINGS

While the preferred embodiment will be described more fully hereafter with respect to the accompanying drawings in which a preferred embodiment of the present invention is shown, it will be understood at the outset of the description which follows that persons of skill in the appropriate arts may modify the invention herein described while still achieving the favorable results of the present invention. Accordingly, the description which follows is understood as being a broad, teaching disclosure of the invention directed to those of skill in the appropriate arts and not as limiting upon the present invention.

Figure 1:
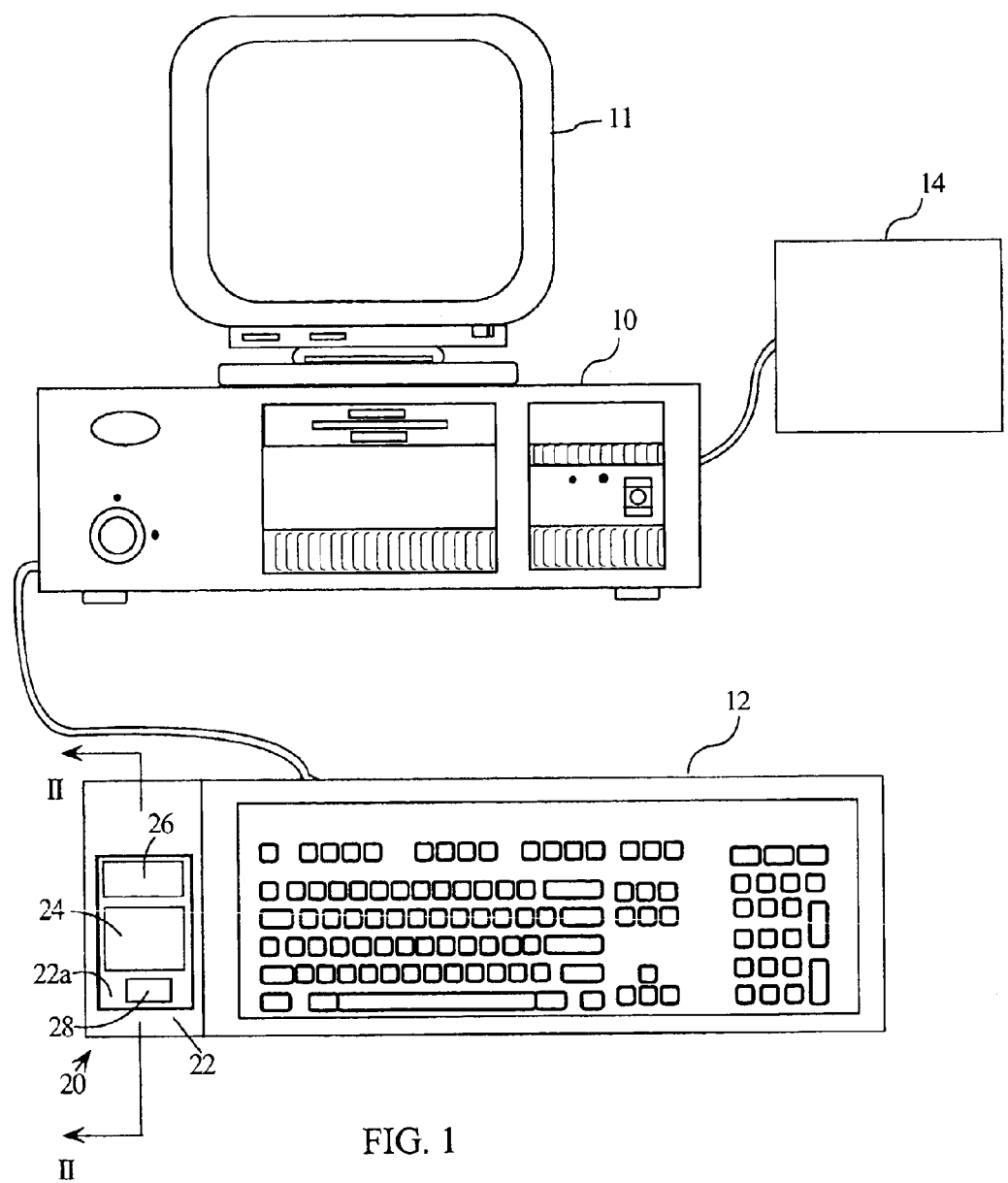
FIG. 1 is a perspective view of a personal computer including the improved biometric sensor of the present invention.

Referring now more particularly to the drawings, FIG. 1 shows a personal computer which includes a system unit 10, a display or monitor 11 and a keyboard 12. The systems unit 10 is connected by a conductor to a peripheral device 14, which may be a printer in some installations and may be a connection to a data transmission network in other environments.

Shown as a part of the keyboard 12 is a biometric sensing system 20. The biometric sensing system 20 is shown mounted within a portion 22 of the keyboard housing, with a biometric sensor 24 shown in an aperture 22a of the housing 22. A second sensor 28 is also mounted within the aperture 22a, and a movable cover 26 is shown in its open position in FIG. 1.

The biometric sensing system 20 is located within the keyboard in the preferred embodiment, although other locations are possible and could be used to advantage in the present invention. Examples of other locations include on the computer system unit 10, or peripheral device 14.

The biometric sensor 24 is a fingerprint sensor in its preferred embodiment, although other biometric sensors are known and could be used to advantage in the present invention. Examples of such other biometric sensors which are known and useful in identifying individuals through their biometric characteristics are retinal scan devices (for scanning the retina or rear surface of the eye for identifying characteristics), signature dynamics, hand geometry devices, and similar systems, all of which are well known in the art. Fingerprint systems for scanning the finger of an individual and providing electrical signals indicative of the patterns of ridges and depressions in the human fingerprint are well known and readily available. One design of such fingerprint sensor involves using a CMOS sensing array coupled to decoding electronics. One fingerprint scanner which is available for purchase commercially is from Fingerprint Technologies and provides an image area of about one inch by three-quarters of an inch in a package which is about 2 inches by 2 inches by 6 inches, with a 500 pels per inch sensitivity in the image area.

The present invention uses conventional techniques for processing the sensed fingerprint and then providing an input to compare whether the fingerprint matches the stored fingerprint information (a catalog of authorized users, by fingerprint characteristics, stored in the memory of the personal computer, perhaps stored through an initial authorization process), none of which is particularly unusual and which is ancillary to the present invention.

The second sensor 28 is a sensor which is positioned immediately adjacent to the biometric sensor so that the biometric input device (the finger in the fingerprint scanner embodiment) which is in contact with the biometric sensor 24 must be in contact with the second sensor 28. This second sensor is a sensor which assures that the biometric input device (the finger) is indeed attached to a living body, and accomplishes this by sensing a physical quantity associated with a living person, in the preferred embodiment, blood oxygen which is passing through a body and which differs from blood which is not in a living body. The blood oxygen is sensed by a photoelectric device which is sensitive to light in the red region of between 660 and 930 nanometers, or between the red and the infrared regions of the light spectrum.

Alternatively or additionally, the second sensor 28 may sense pulse or thermal characteristics of the individuals to insure that the finger is attached to a live human and is not a dead finger or a plastic (or latex molded) finger substitute. These sensors exist and a re generally available and the sensed output from such sensors have well known characteristics. For example, the pulse of an individual has a characteristic frequency range; while the temperature of an individual also varies, the range of such variation is rather narrow but yet differentiates a live finger from an imitation. Such life-sensing sensors are well known in the art and the primary feature of the present invention is the positioning of the second sensor 28 immediately adjacent to the biometric sensor 24 so that an individual simultaneously engages both sensors, and the associated requirement that all sensors provide successful authorization in their intended modes simultaneously. Additionally, some technologies may allow various sensing techniques to be co-located (for example, on various microscopic levels of a single integrated circuit), and combining different biometric sensing technologies in this way is included in the conception of the inventors.

Figure 2:
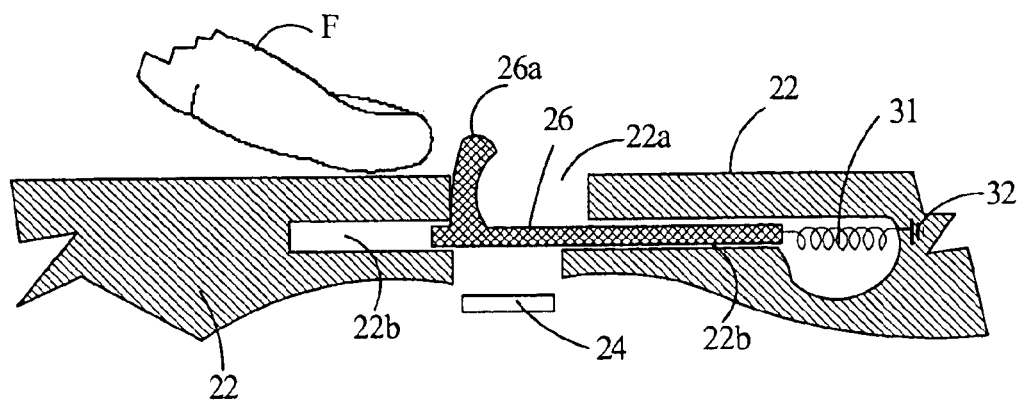
FIG. 2 is a cutaway view of a section of the personal computer of FIG. 1, taken along the line II—II in FIG. 1, showing a biometric sensor with a movable cover in its closed position.

FIG. 2 illustrates a cutaway section of the keyboard of FIG. 1, showing the relevant portions of a fingerprint sensing system including portions of the present invention. A finger F is shown positioned on the housing 22 adjacent the aperture 22a with the cover 26 in its closed position to protect the biometric sensor 24. Note that the second sensor 28 is not shown in this view.

The cover 26 fits within a receiving pocket 22b defined within the housing 22, the pocket being defined between upper and lower portions which provide guides for receiving and retaining the cover 26 in the appropriate position therebetween. A spring 31 is attached to the cover 26 at one end and is connected to a mounting 32 on the housing. The spring 31 biases the cover into its normally closed position of FIG. 2, until a user overcomes the spring force to open the cover 26 by compressing the spring to its position as shown in FIG. 2A.

Figure 2A:
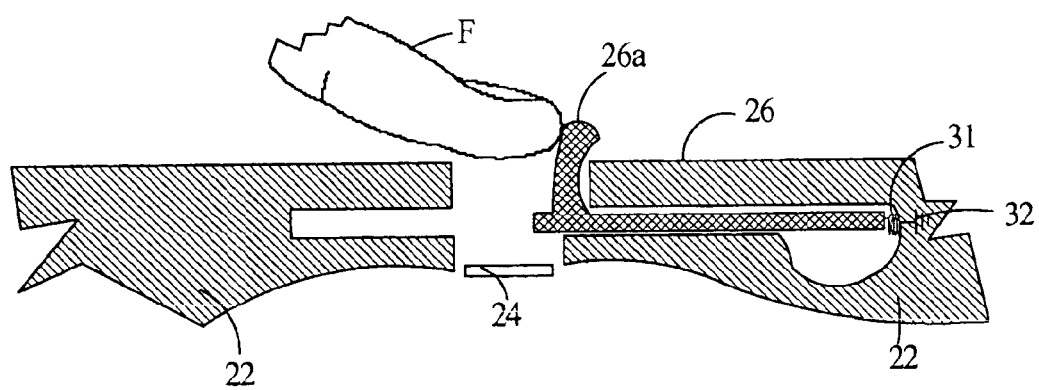
FIG. 2A is a view of the personal computer section of FIG. 2 with the movable cover in its open position.

The cover 26 includes a projection 26a which serves as a limiting device, preventing the cover from traveling farther to the right than its position in FIG. 2A. The projection 26 has a hooked end portion which serves as a latch to keep the cover open while the finger is in position, if a separate latch is desired (as opposed to the finger itself providing the force to keep the cover 26 open while the fingerprint is being sensed).

While the cover 26 may be made of a metallic, electrically conductive material such as copper, iron or steel or some other ally, it is preferable from a cost, weight and ease of manufacturing standpoint that it be made of a core plastic material, with an outer surface of electrically conductive material so that a user, as he is opening the cover 26 with his finger is simultaneously and without further effort discharging any static electricity that may be present in his body, rather than discharging this static electricity on the biometric sensor 28 where the electricity could cause either an erroneous reading or damage to the circuit element. A current path from the cover to the system reference ground 26 is also provided, which, in this case, could either be a separate grounding path (not shown) or through the spring 31 and mounting 32.

Referring now to FIGS. 3 and 3A which shows an alternate embodiment of a biometric sensing system for a personal computer. The biometric sensor 24 is shown, positioned within an aperture 22a of a housing 22 of the keyboard. A cover member 26 has an aperture 42 which is movable between a closed position of FIG. 3 and an open position of FIG. 3A. The cover member 26 is movable between these two positions by a solenoid 41 When the cover member is in its open position of FIG. 3A, the aperture 42 is directly aligned with the sensor 24 to allow a finger F to access the sensor 24. Also shown in these Figures is an optional key lock 43 which is movable between a locked position in FIG. 3 and an unlocked position in FIG. 3A, by allowing a latching mechanism 44 to rotate when the lock is open and allow the cover 26 to move. Additionally, an optional proximity sensor 45 is shown which provides a signal indicative of the position of the cover 26. The state of the solenoid 41 and proximity sensor 45 may be controlled by and sensed by the attached personal computer respectively, allowing various additional software-controlled approaches to controlling access to the sensor array.

Of course, many modifications of the present invention are possible without departing from the spirit of the present invention. Further, it is possible to use some of the features of the present invention without the corresponding use of other features. Accordingly, the foregoing description of the preferred embodiment should be considered as merely illustrative of the principles of the present invention and not in limitation thereof, the scope of the invention being defined solely by the following claims.

Having thus described the invention, what is claimed is:

1. A personal computer comprising:

a memory;

an input device;

a processor connected to the memory and the input device for receiving inputs from the input device;

a biometric sensing system for controlling access to the personal computer processor and memory, said biometric sensing system including a first biometric sensor for receiving a personal input and identifying the individual, at least one additional sensor adjacent to the biometric sensor for determining whether the personal input is from a living person and a cover for protecting the biometric sensor and the at least one additional sensor from environmental forces when the sensor is not in use, wherein the at least one additional sensor is positioned so close to the biometric sensor that an individual making an input at the biometric sensor prevents an other from providing an input at the additional sensor, and wherein the at least one additional sensor for determining whether the input is from a living person includes an oxygen sensing mechanism which provides an output which distinguishes living from dead.

2. A method of providing biometric identification for security at a personal computer, the steps of the method comprising:

providing a biometric sensor within a housing of a personal computer and coupled to a processor for determining whether an individual is authorized to use the personal computer;

providing a cover over the biometric sensor to protect it from environmental forces including electrostatic discharges; and providing at least one additional sensor co-located with the biometric sensor for assuring that the biometric input at the biometric sensor is from a living person, wherein the step of providing at least one additional sensor includes the step of sensing the amount of blood oxygen in the individual to determine that the biometric input is from a living person.

3. A personal computer comprising:

a memory;

an input device;

a processor connected to the memory and the input device for receiving inputs from the input device;

a biometric sensing system for controlling access to the personal computer processor and memory, said biometric sensing system including a first biometric sensor for receiving a personal input and identifying the individual, at least one additional sensor adjacent to the biometric sensor for determining whether the personal input is from a living person and a cover for protecting the biometric sensor and the at least one additional sensor from environmental forces when the sensor is not in use, wherein the cover for protecting the sensors from environmental forces includes a discharge path fro electrostatic charges to shunt such electrostatic charges away from the sensors and equalize electrostatic charge potential between the body of the user and the computer system, and wherein the position of the cover for protecting the sensors from environmental forces is controlled and sensed by the connected personal computer.

4. A method of providing biometric identification for security at a personal computer, the steps of the method comprising:

providing a biometric sensor within a housing of a personal computer and coupled to a processor for determining whether an individual is authorized to use the personal computer;

providing a cover over the biometric sensor to protect it from environmental forces including electrostatic discharges; and providing at least one additional sensor co-located with the biometric sensor for assuring that the biometric input at the biometric sensor is from a living person, wherein the step of providing said biometric sensor within the housing includes the step of locating the biometric sensor in a peripheral device attached to the personal computer.

* * * * *

UNITED STATES PATENT AND TRADEMARK OFFICE
CERTIFICATE OF CORRECTION

PATENT NO. : 6,871,242 B1
DATED : March 22, 2005
INVENTOR(S) : Ho-Lung et al.

It is certified that error appears in the above-identified patent and that said Letters Patent is hereby corrected as shown below:

Column 6,
Line 24, prior to "electrostatic changes to shunt such electrostatic" please correct the spelling of "fro" to -- for --.

Signed and Sealed this

Sixth Day of September, 2005

JON W. DUDAS
*Director of the United States Patent and Trademark Office*